United States Patent [19]

Newton et al.

[11] Patent Number: 4,958,543

[45] Date of Patent: Sep. 25, 1990

[54] OVERHEAD LOADER AND RELATED MECHANISMS FOR HIGH SPEED AUTOMATIC LATHES AND THE LIKE

[75] Inventors: George Newton, New Milford; Douglas A. Parzuchowski, Danbury, both of Conn.

[73] Assignee: The Dunham Tool Co., Inc., New Fairfield, Conn.

[21] Appl. No.: 291,493

[22] Filed: Dec. 29, 1988

[51] Int. Cl.⁵ ............................................. B23B 13/00
[52] U.S. Cl. ....................................... 82/124; 82/126; 82/152; 82/153; 414/17
[58] Field of Search ................. 82/124, 125, 126, 127, 82/152, 153; 414/17, 18

[56] References Cited
U.S. PATENT DOCUMENTS

| | | | |
|---|---|---|---|
| 3,651,958 | 3/1972 | Evans et al. | 82/125 |
| 3,658,190 | 1/1972 | Fournier | 82/124 |
| 4,061,062 | 12/1977 | Peltier | 82/125 |
| 4,161,849 | 7/1979 | Voumard et al. | 82/124 |
| 4,317,394 | 3/1982 | Link et al. | 82/124 |
| 4,406,193 | 9/1983 | Sugino et al. | 82/124 |
| 4,838,135 | 6/1989 | Heroyan | 82/124 |

Primary Examiner—Frederick R. Schmidt
Assistant Examiner—Mark F. Frazier
Attorney, Agent, or Firm—Schweitzer & Cornman

[57] ABSTRACT

A high speed, overhead loader mechanism is disclosed, for use in connection with an automatic lathe. A simplified, versatile basic vertical positioning mechanism is provided, which mounts on the spindle housing of the lathe and accommodates a wide variety of customized loading fixtures, for parts of various sizes and shapes. Also disclosed are unique forms of part feeders and ejectors for supply and discharge of parts to and from an automatic lathe.

12 Claims, 7 Drawing Sheets

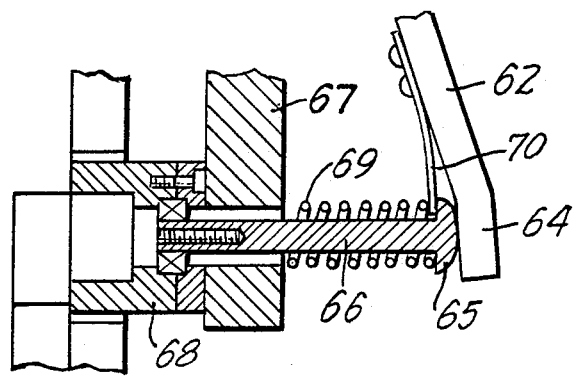
FIG. 1A.
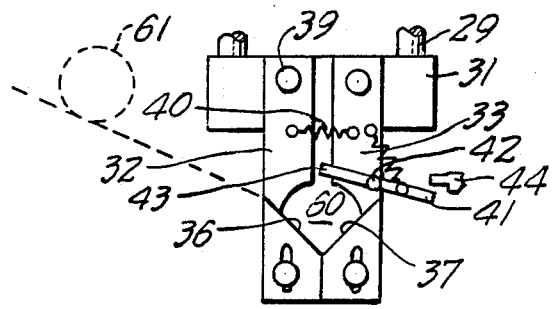
FIG. 1B.
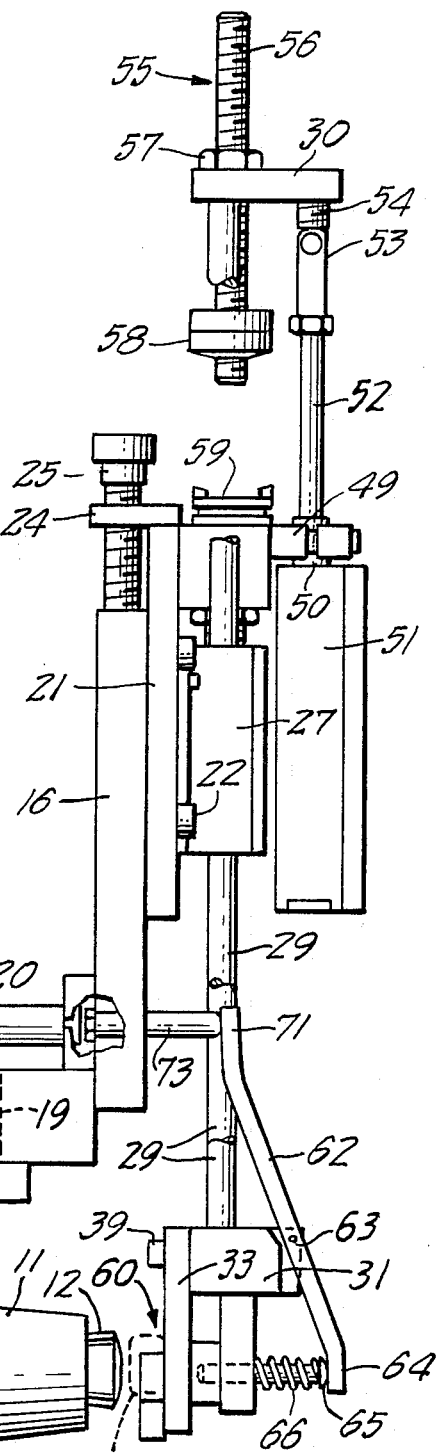
FIG. 1.
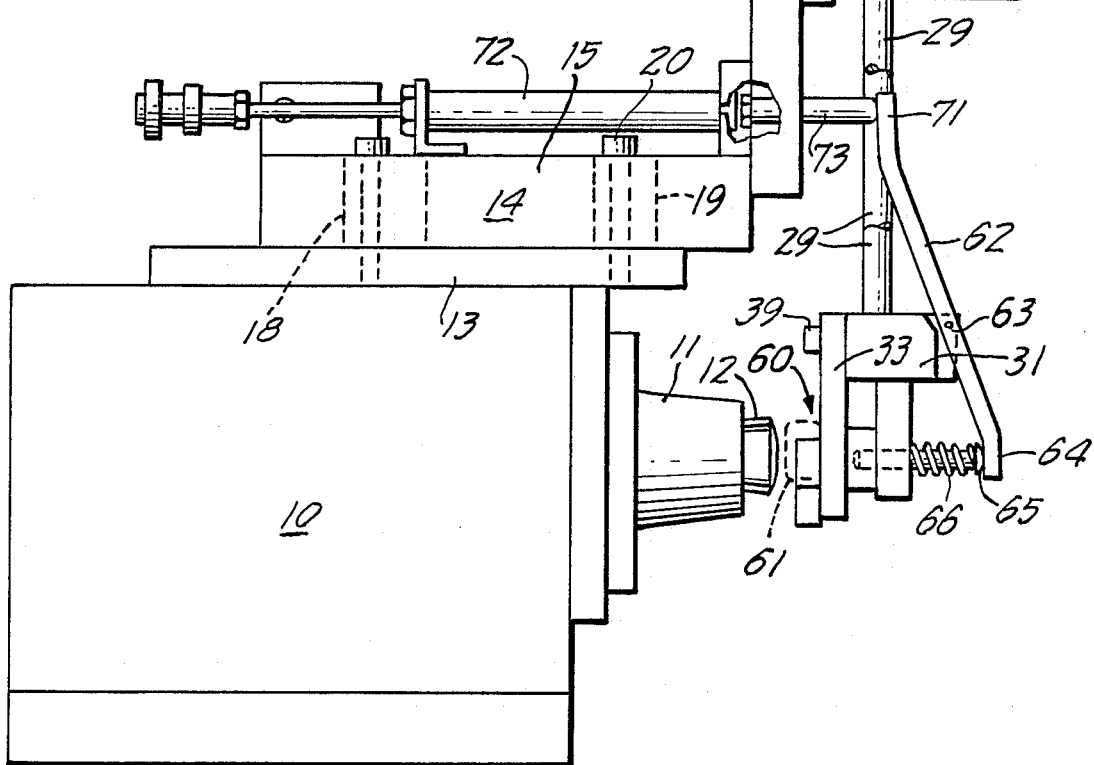

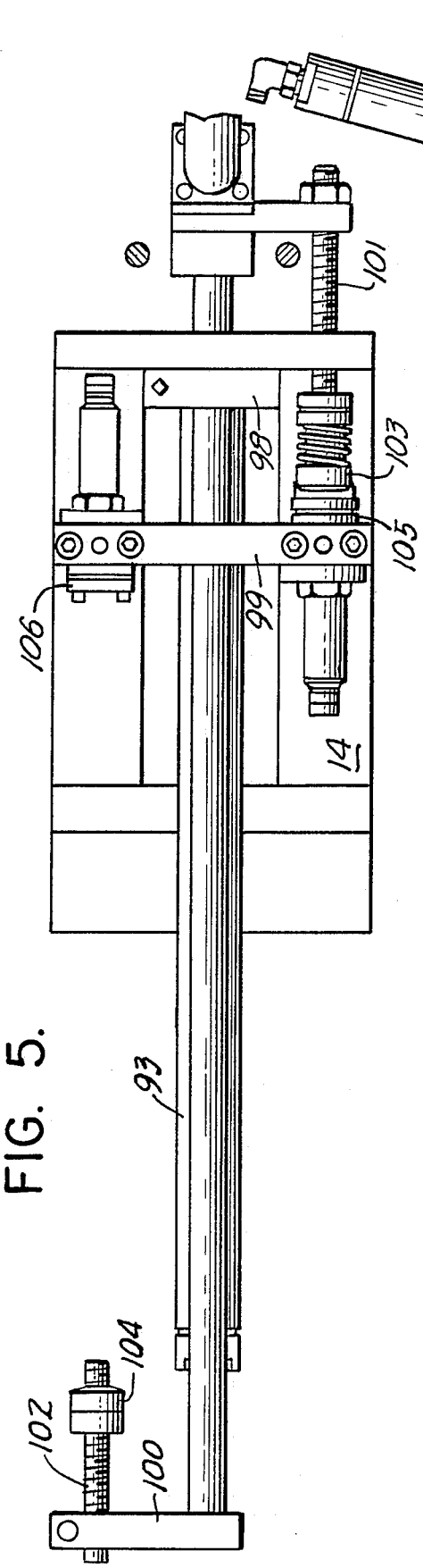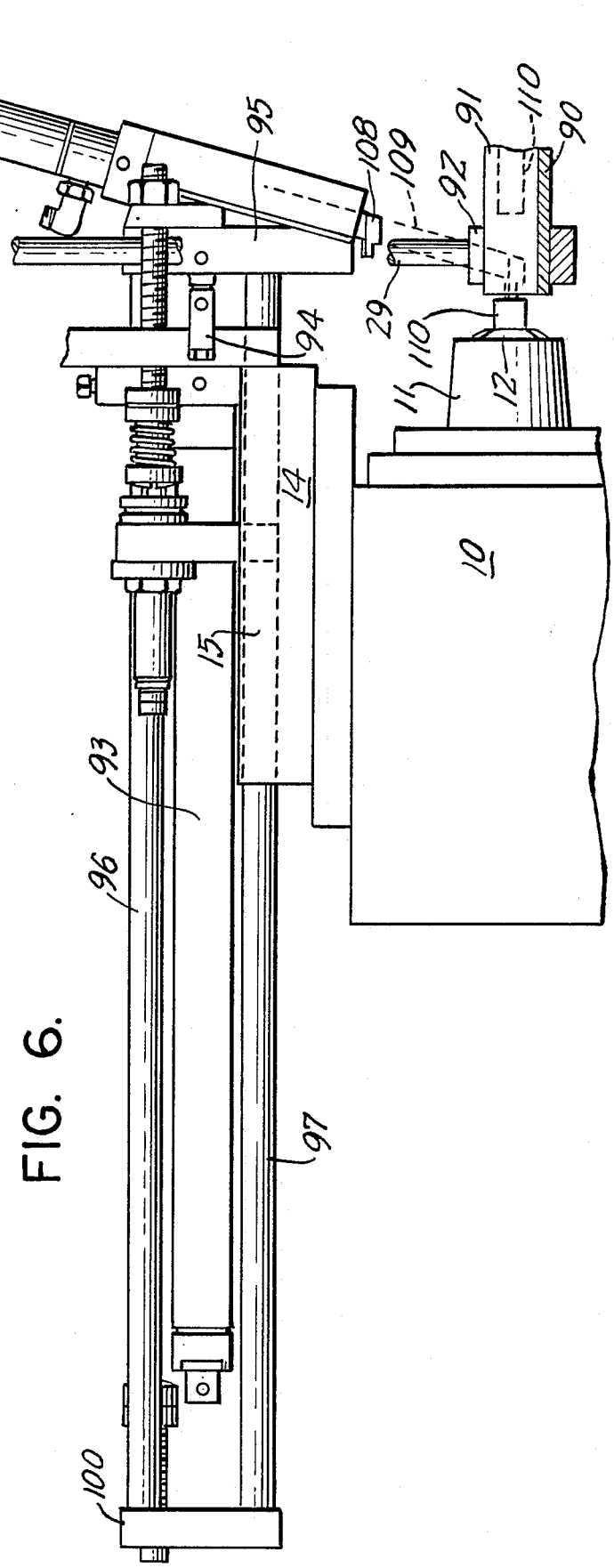

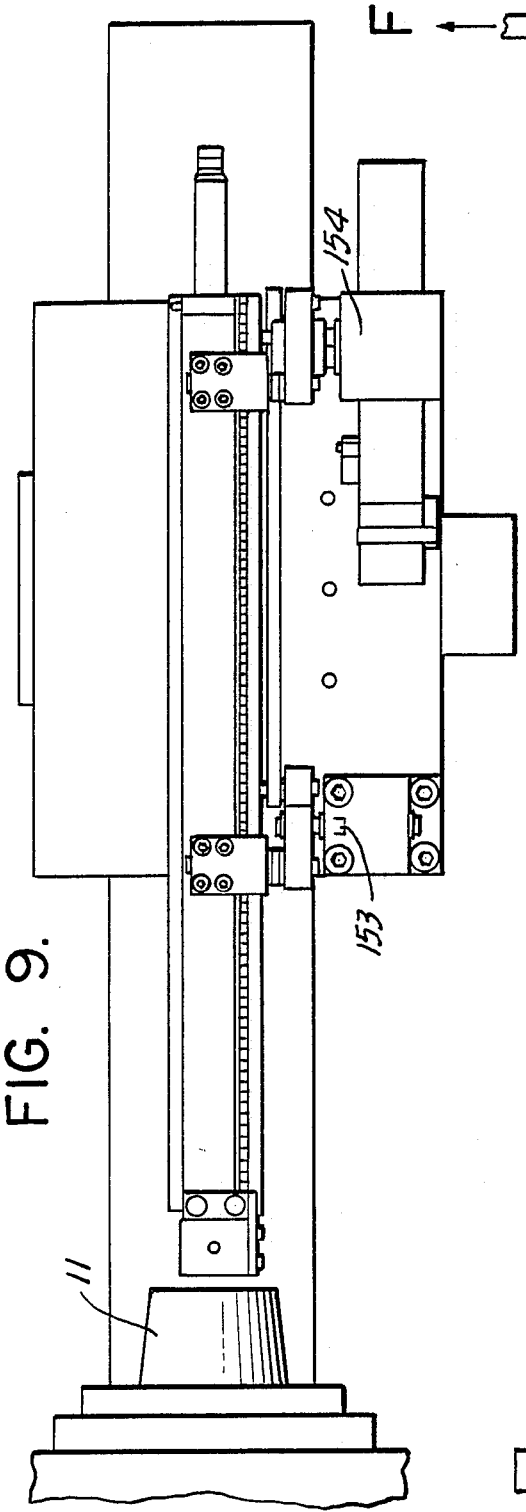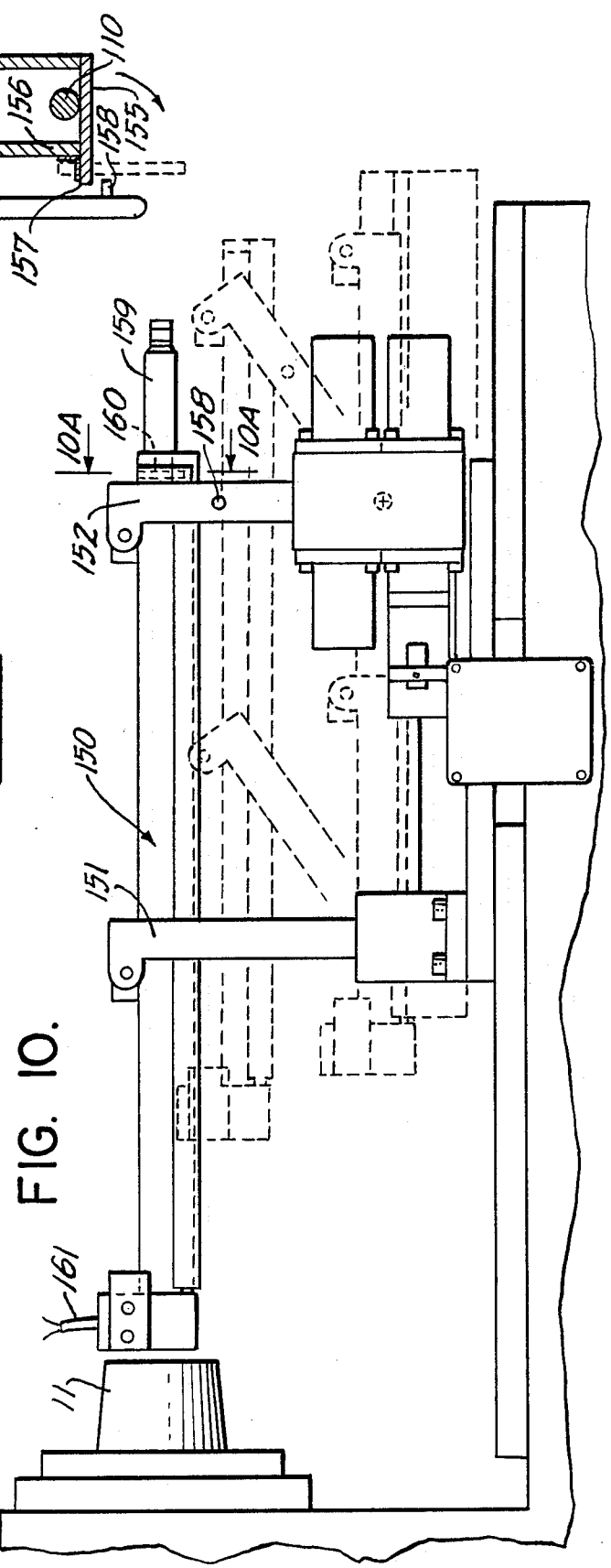

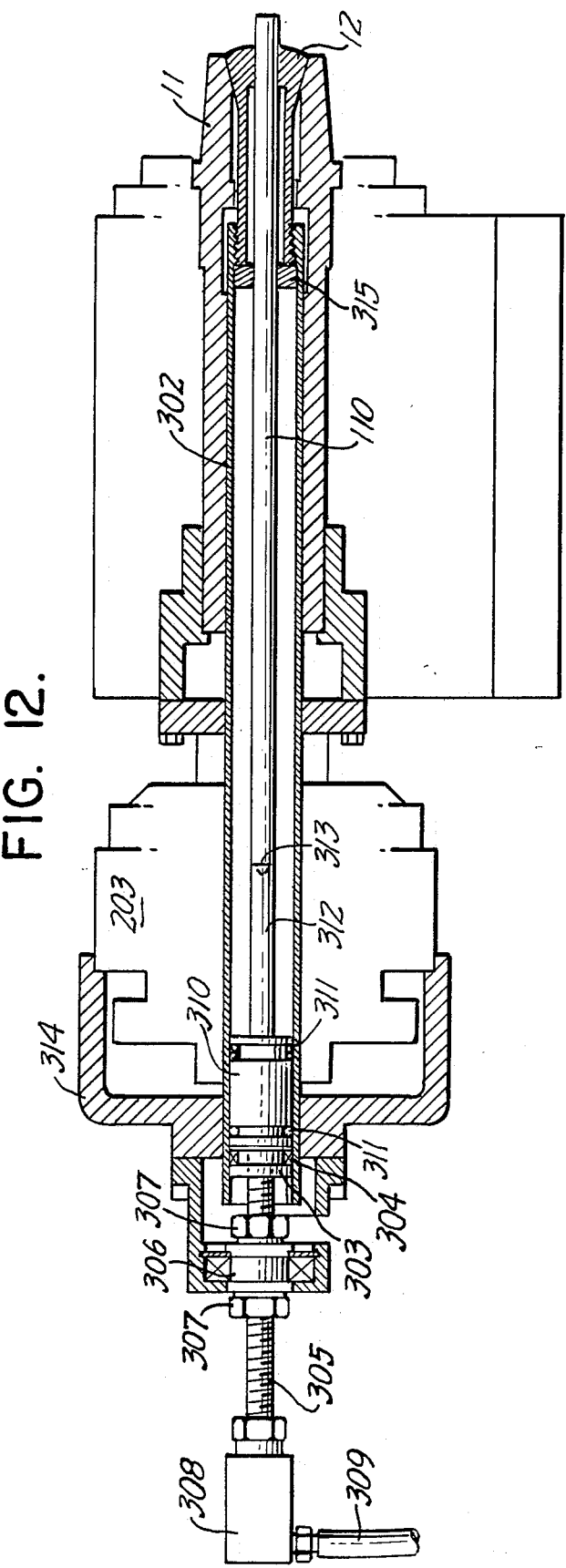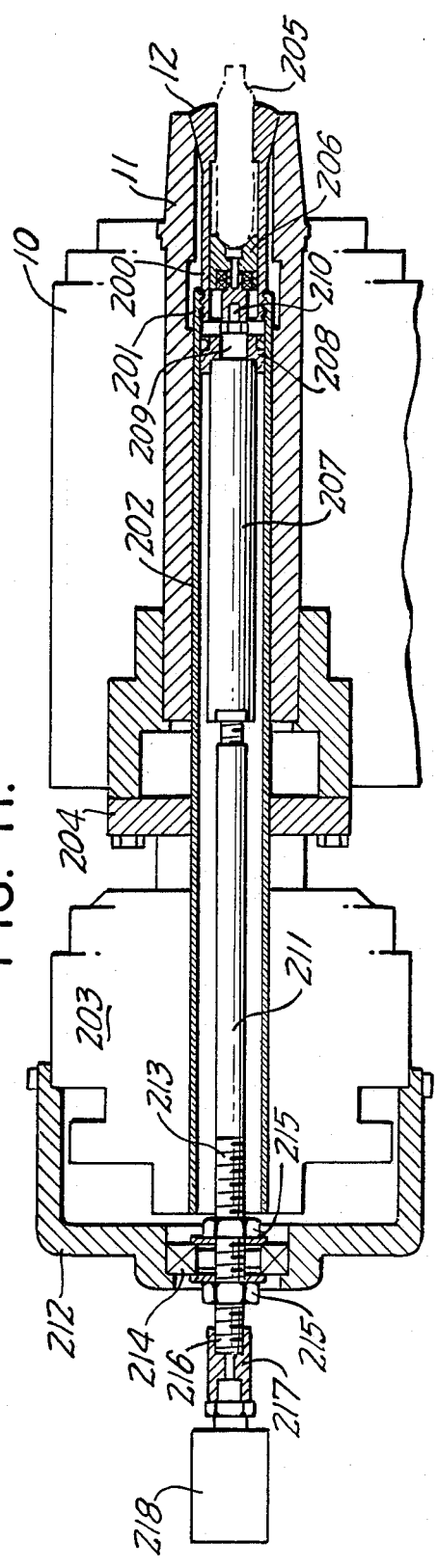
FIG. 12.
FIG. 11.

OVERHEAD LOADER AND RELATED MECHANISMS FOR HIGH SPEED AUTOMATIC LATHES AND THE LIKE

BACKGROUND AND SUMMARY OF THE INVENTION

In connection with the automatic machining of parts, it is well-known to utilize programmed machining operations in conjunction with automatic, programmed loading and unloading facilities. Typically, however, automatic loading and unloading equipment tends to be of a highly customized nature and therefore very expensive to manufacture and install. As a result automatic loading and unloading equipment tends to be limited to relatively larger and more costly machining equipment, in which the cost of the loading/unloading facilities can readily be absorbed in the overall cost of the equipment.

The present invention deals with the provision of automatic loading/unloading equipment intended especially for relatively small, relatively low-cost machining equipment, such as a small, high speed automatic lathe.

In part, the invention is directed to the provision of a novel, highly simplified and highly universal form of workpiece loading mechanism for a small automatic lathe or the like. A particular feature of the invention resides in its highly universal construction, such that it may be utilized in large measure in the handling of a great variety of parts for a small automatic lathe. Accordingly, because a great deal of the loader mechanism is of a standardized construction, the cost of installing the loader may be kept to a minimum in keeping with the nature of the parts being manufactured and the equipment upon which the work is being performed.

Pursuant to one aspect of the invention, a novel and improved vertical positioning mechanism is provided which includes a relatively simplified yet extremely effective universal mounting bracket arrangement, for mounting of the vertical positioning mechanism in an effective working position, given the nature of the workpiece being handled. To advantage, the apparatus includes a generally L-shaped bracket, which is adjustably mounted above the spindle housing of an automatic lathe or the like, positioned for limited fore and aft adjustment in the direction of the spindle axis for proper positioning of the loading mechanism in front of the spindle and chuck. An upwardly extending portion of the L-shaped bracket adjustably mounts a positioning mechanism, including a workpiece holding cradle and vertical guide means for raising and lowering the cradle. The mechanism is driven by an actuator, provided with adjustable stop means for limiting the length of the stroke. By adjustably vertically positioning the mechanism on the L-shaped bracket, and adjustably limiting the stroke of the actuator, the vertical movement of the workpiece carrying cradle may be precisely adjusted at upper and lower limit positions.

Pursuant to the invention, the workpiece positioning mechanism generally described above can be substantially universally applied to the handling of a wide variety of sizes and shapes of workpieces such that, even though the specific loading requirements are highly individualized and highly customized, the loading apparatus of the invention may nevertheless be standardized to a fairly high degree, so that the part loading equipment may be made available to the machine users on a cost-effective basis.

With the apparatus of the invention, the main workpiece positioning mechanism is retracted during machining operations, during which time a single workpiece is loaded into a movable cradle block. Upon completion of a machining operation, the finished part is ejected from the work-holding chuck, and the part loader is actuated to bring the new workpiece into precise alignment with the chuck. At this juncture, a second actuator is operated to drive the workpiece out of its delivery cradle and into the gripping chuck. Because various parts may vary greatly in overall length, the apparatus of the invention contemplates and accommodates a variety of mechanism for injecting the workpiece from the delivery cradle into the gripping chuck. One of the significant advantages of the structure of the invention, in this respect, is that the basic workpiece positioning mechanism is sufficiently universal in its design to accommodate a variety of simple and inexpensive part injector mechanisms which may be carried by or mounted independently of the delivery mechanism.

In one advantageous form of the invention, useful for very short parts, a simple injector lever mechanism is carried by the workpiece positioning apparatus. When the workpiece is delivered into alignment with the gripping chuck, the injector lever is also in alignment with an actuator device, mounted on the main universal bracket. When the mechanisms are thus aligned, the injector actuator is energized to cause the part to be delivered into the gripping chuck.

In another advantageous form of the invention, useful for parts of somewhat greater length, the injector actuator may be carried directly on the workpiece positioning mechanism.

For still longer parts, the part injector mechanism may be mounted in fixed relation on the universal bracket and provided with an elongated operating rod, which extends over the top of the workpiece, when the latter is aligned with the gripping chuck, and engages the part from its outboard end. The actuator is then retracted to cause the workpiece to be injected into the gripping chuck from the delivery cradle.

In accordance with another aspect of the invention, novel and advantageous facilities are provided for the feeding and ejection of highly elongated workpieces, so that both the part injection and ejection operations are carried out reliably, but at a relatively high rate of speed, in keeping with the demands of a high speed machining operation. To this end, one of the features of the invention relates to the provision of a new and advantageous construction of saw tooth-type feeder, especially for feeding elongated workpieces one-at-a-time to the loader mechanism, while maintaining the workpieces under effective control. The new mechanism uses an advantageous form of actuating arrangement for a saw tooth-type feeder, providing a reliable and rugged mechanism at minimum cost.

In accordance with another aspect of the invention, novel and unique arrangements are provided, for use in a draw tube collet chuck gripping mechanism, for ejection of the workpiece from its gripping collet. In a collet chuck gripping arrangement, it is typical to provide an elongated rearwardly extending draw tube engaged at the rear of the spindle for drawing the collet chuck into a tapered socket and thereby causing gripping pressure to be exerted on the workpiece. In the apparatus of the invention, novel arrangements for part ejection are incorporated within the hollow draw tube in a highly unique and advantageous manner. In one particularly advantageous form, the draw tube constitutes an integral part of a fluid actuating cylinder, which serves to eject a finished workpiece from the collet at the end of a machining operation.

For a more complete understanding of the above and other features and advantages of the invention, reference should be made to the following detailed description of preferred embodiments of the invention, and to the accompanying drawings.

DESCRIPTION OF THE DRAWINGS

FIG. 1 is a fragmentary side elevational view showing the spindle housing portion of a typical automatic lathe, provided with workpiece positioning and loading mechanisms according to one embodiment of the invention.

FIG. 1A is an enlarged, fragmentary cross-sectional view illustrating certain details of a workpiece injector mechanism incorporated in the apparatus of FIG. 1.

FIG. 1B is an enlarged, fragmentary end elevational view of a workpiece delivery cradle arrangement utilized in the apparatus of FIG. 1.

FIGS. 5 and 6 are fragmentary top plan and side elevational views, respectively, of apparatus constructed in accordance with the invention, provided with a workpiece injector mechanism designed especially for workpieces of relatively great length.

FIGS. 9 and 10 are top plan and side elevational views, respectively, of an advantageous form of part removal mechanism useful in conjunction with the apparatus of the invention, especially for the handling of elongated workpieces.

FIG. 10A is an enlarged, fragmentary cross-sectional view, as taken generally on Line 10A—10A of FIG. 10.

FIG. 11 is a longitudinal cross-sectional view through a spindle housing of an automatic lathe, illustrating a novel and advantageous form of part ejector mechanism utilizing the draw tube structure of the lathe.

FIG. 12 is a modified form of part ejector mechanism housed within the draw tube of the automatic lathe.

DESCRIPTION OF PREFERRED EMBODIMENTS OF THE INVENTION

Figure 2:
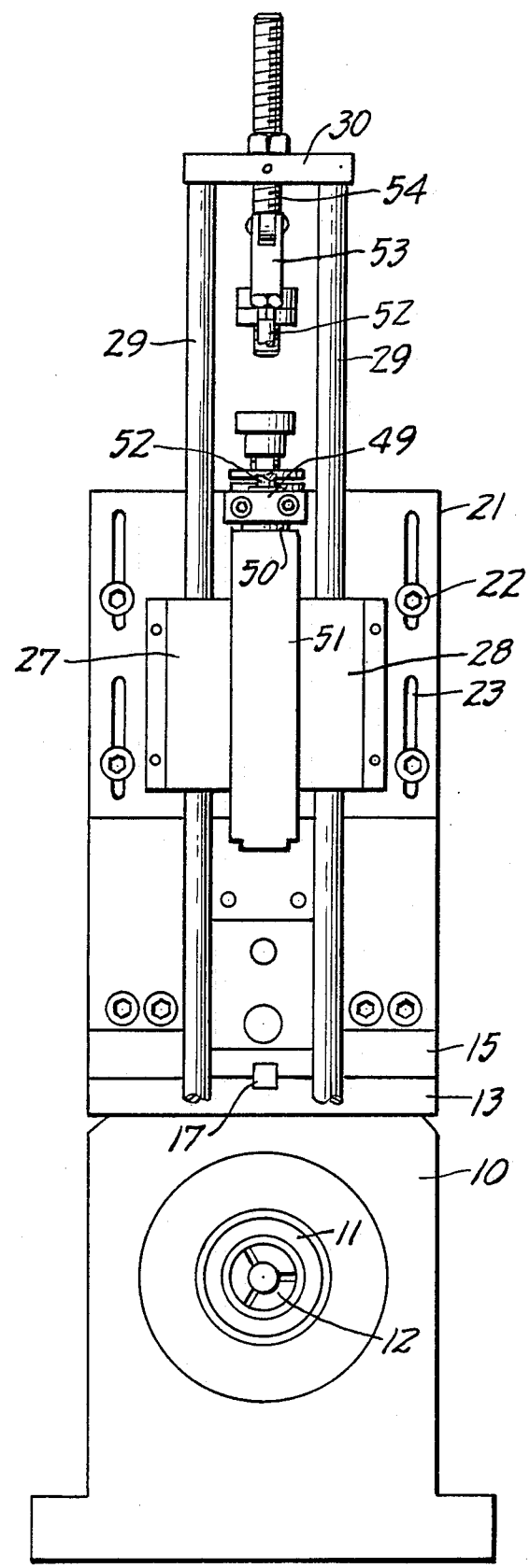
FIG. 2 is a front elevational view, with parts broken away, of the apparatus of FIG. 1.

Referring now to the drawings, and initially to FIGS. 1 and 2 thereof, the reference numeral 10 designates in a general way the spindle housing portion of a generally conventional high speed automatic lathe. Typically, the lathe includes additional components, as will be appreciated by those skilled in the art, including a tool slide and cutting tools, drive means, gripper actuating means, and the like. These features, constituting no part of the present invention, are omitted for the sake of simplicity.

In the illustrated lathe, a spindle 11 is journalled in the spindle housing 10 and carries a collet chuck 12. The collet chuck 12 is of a conventional type, operable by means of a draw tube (see FIG. 11) which is connected to a suitable rotary actuator at the rear of the spindle housing 10 in a known manner.

Machining operations on the lathe are carried out by first gripping a workpiece in the collet chuck 12 and rotating the spindle 11 while cutting and shaping tools (not shown) are brought into contact with the rotating workpiece. The present invention is directed to facilities for automatically loading workpieces into the collet chuck 12 and effecting removal therefrom.

In accordance with one aspect of the invention, a base plate 13 is secured to the top of the spindle housing 10, by bolts or other suitable means (not shown). Mounted on the base plate 13 is an L-shaped universal mounting bracket 14, which comprises a horizontal plate 15 and a vertical plate 16 rigidly attached thereto. The horizontal bracket plate 15 is keyed to the base plate 13 by means of a longitudinally extending key 17 (FIG. 2) which aligns the bracket plate 15 with the base plate 13 while accommodating limited degree of fore and aft adjustment of the bracket plate 15 in a direction parallel to the rotational axis of the spindle 11. To this end, the bracket plate 15 may be provided with elongated openings 18, 19, in which are received bolts 20 engaged with the base plate 13. The slotted openings 18, 19 and bolts 20 permit adjustable positioning of the L-shaped bracket 14, to provide part clearance, as will become apparent.

In accordance with one aspect of the invention, there is mounted on the front of the vertical bracket plate 16, an adjustable positioning plate 21, which is secured to the vertical bracket plate 16 by means of bolts 22, received in vertically elongated slots 23 in the positioning plate and extending through to the bracket plate 16. At the upper edge of the adjustment plate 21 is a lug 24, which extends over the top of the bracket plate 16 and threadedly engages a precision position adjustment screw 25. The lower end 26 of the screw bears upon the plate 16 and enables the positioning plate 21 to be precisely adjusted, vertically, in relation to the bracket 16, and therefore in relation to the axis of the lathe spindle 11. Typically, after initial adjustment of the plate 21 for a particular workpiece, it is tightly secured to the bracket by means of the bolts 22.

Mounted on the positioning plate 21 are linear-bearing boxes 27, 28, which provide for relatively friction free, precision linear guidance of elongated, vertically disposed support rods 29. As shown in FIG. 2, the rods 29 are spaced apart in straddling relation to the central axis of the spindle 11, and they are rigidly connected together at the top by means of a horizontal plate 30.

In the form of the invention illustrated in FIGS. 1-2, the vertical support rods 29, forming part of a vertical positioning mechanism are rigidly secured at their lower ends to a block 31 mounting on its rear face a pair of downwardly extending cradle supports 32,33, each carrying a support block 34,35 provided with downwardly and inwardly angled surfaces 36,37. The support blocks 34,35 are secured by screws 38 for limited adjustability, in order to provide accurate adjustment of the intersection of the angle faces 36,37, to form a V-shaped workpiece supporting cradle.

To advantage, the downwardly extending support elements 32,33 are pivotally mounted by means of bolts 39, extending into the support block 31, and are held together by means of a spring 40. The spring 40 allows the two parts of the cradle to separate against the restraining force of the spring 40, if necessary.

Desirably, one of the cradle support arms 33 is provided with a resiliently deflectable lever 41, pivoted at 42 on the support element, and having a portion 43 overlying the V-shaped workpiece cradle area. The cradle mechanism, as shown in FIG. 1B, is adapted for the feeding of a generally cylindrical part of relatively short axial length. The feeder cradle is employed with a conventional, one-at-a-time supply device, indicated schematically in broken lines in FIG. 1B, which may be in the form of a simple inclined chute arranged to cause the parts (see item 61, FIG. 1B) to roll downwardly, by gravity, for deposit into the V-shaped cradle, when the cradle is in an elevated (retracted) position. Such one-at-a-time supply means are, per se, well-known and form no part of the present invention.

In the illustrated device, when the workpiece cradle is in its elevated position, the outer end of the lever 41 is engaged by a stationary lug 44, which causes the inner end 43 of the lever to be pivoted upwardly, allowing deposit of the workpiece into the cradle formed by the inclined surfaces 36,37. When the cradle subsequently is moved downwardly, toward a delivery position, the lever 41 is released by the lug, allowing the lever portion 43 to be pressed downward on the workpiece to retain it in position during the transfer motion.

In the apparatus of the invention, the adjustable positioning plate 21 carries in its center upper center area, between the support rods 29, a mounting block 49, for gripping the neck 50 of a fluid actuator 51, oriented on a vertical axis. The operating rod 52 of the actuator extends upwardly and is connected by a clevis 53 and lug 54 to the plate 30 rigidly joining the upper ends of the support rods 29.

Extending downward from the plate 30, parallel to the actuator rod 52, is an adjustable stop device 55 comprising a threaded rod 56, engaged with the plate 30 and secured in a preadjusted position by a stop nut 57. A calibrated stop collar element 58 is threadedly engaged to the stop rod 56 adjacent to its lower end, and is adjustably movable along the rod. Directly below the calibrated stop collar is a hydraulically cushioned abutment 59, which is arranged to engage the lower surface of the stop collar 58 at the lower limit of its movement, decelerate it from its initial travel speed and bring it to a full stop at a precisely located position.

In the operation of the mechanism thus far described, the workpiece loading cradle assembly, generally designated by the reference numeral 60 is raised to an upper or retracted limit position by upward extension of the actuator rod 52 to the limit of its stroke allowed by the actuator 51. The specific location of the cradle 60, when in this retracted limit position, may be adjusted with precision by means of the adjusting screw 25. When the actuator 51 is energized in the reverse direction, to retract the rod 52, the cradle 60 is lowered to its delivery limit position, which is precisely predetermined by adjustment of the calibrated stop collar 58. In this lower limit position, the adjustment is set so that the workpiece is coaxially aligned with the gripping chuck 12.

In an apparatus according to the invention, provision is made for injection of the workpiece (illustrated at 61 in FIG. 1) into the gripping chuck, which is then actuated in the usual manner to grip the workpiece. As soon as the loader has been retracted, the machining operations can commence. In the arrangement illustrated in FIGS. 1 and 2, the workpiece injector means includes a lever 62 pivoted at 63 on the mounting block 31. The lower end 64 of the lever bears against the outer end 65 of an injector pin 66 (see FIG. IA) which is slidably received in a support 67 extending downward from the block 31. In the illustrated arrangement, a cup assembly 68 is carried at the forward end of the pin 66 and is movable therewith. A spring 69 urges the pin in an outward direction until a cup 68 abuts the support 67. A leaf spring element 70, secured to the lever 62, engages the pin in front of the head 65, to retain the lever end 64 in contact with the outer end of the pin.

As illustrated in FIG. 1, the upper portion of the lever 62 extends upward and somewhat inward to a location well above the block 31. The geometry is such that, when the workpiece positioning mechanism is in its lowered position, as shown in FIG. 1, the upper end 71 of the lever is aligned with the axis of a fluid actuator 72 mounted longitudinally on the bracket plate 15. The actuator has an extendible plunger element 73, which projects through an opening in the vertical bracket plate 16 and, in the retracted position of the actuator 72, is adjacent to or in contact with the upper end 71 of the injector lever. In the operation of the device, as soon as the vertical positioning mechanism reaches its lowered position the actuator 72 is extended sharply, causing the injector pin 66 to be driven rapidly inward, moving the workpiece 61 out of the cradle 60 and into the open jaws of the gripping chuck 12. The chuck is then immediately activated, the cylinder 72 is deactuated to retract the plunger 73, and the positioning mechanism is withdrawn to its vertically retracted position in preparation for a new loading operation while the machining operations proceed on the gripped part.

The basic positioning mechanism shown in FIGS. 1 and 2, comprising the L-shaped bracket arrangement with adjustable fore and aft mounting on the spindle housing, and adjustable up and down mounting of the vertically movable elements, is extremely universal in its application to a wide variety of parts. The mechanism can easily be customized to a particular machine installation and a particular workpiece and machining sequence without requiring the extensive manufacture of customized components. Thus, a substantially standardized vertical loader mechanism may be utilized for most applications, with customization being necessary only in the specific area of the workpiece cradle and the injector mechanism. The specific injector mechanism of the illustrations of FIGS. 1A and 1B is particularly advantageous for short work pieces, which require relatively limited movement of the part injector mechanism. A particular advantage of this arrangement resides in the fact that the fluid actuator and its mounting need not be carried on the vertically reciprocating positioning mechanism.

Figure 3:
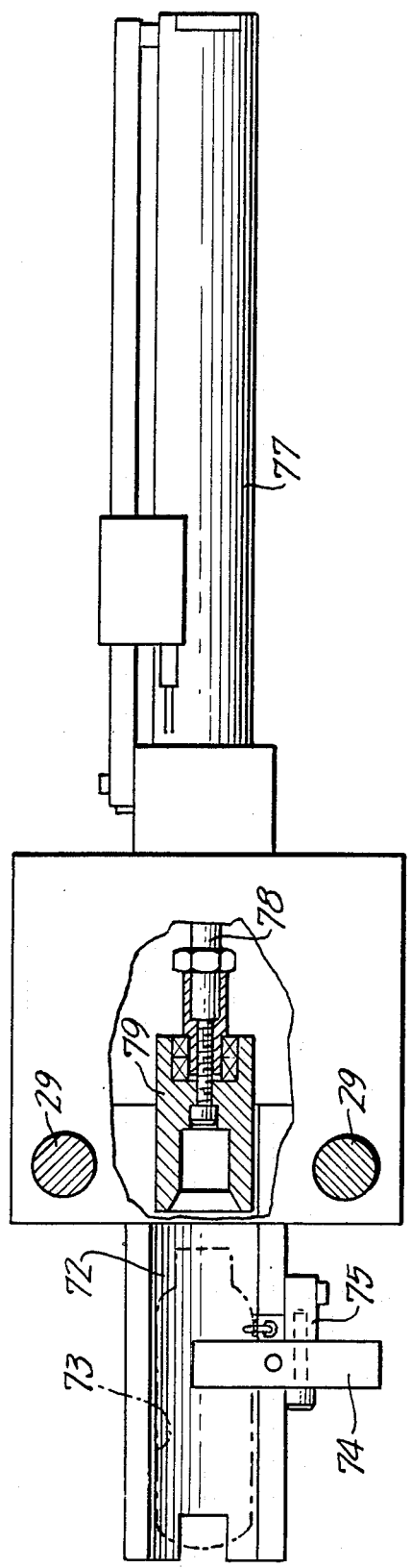
FIGS. 3 and 4 are fragmentary top plan and side elevational views, respectively, of apparatus constructed in accordance with the invention, provided with a workpiece injector mechanism designed especially for workpieces of medium length.
Figure 4:
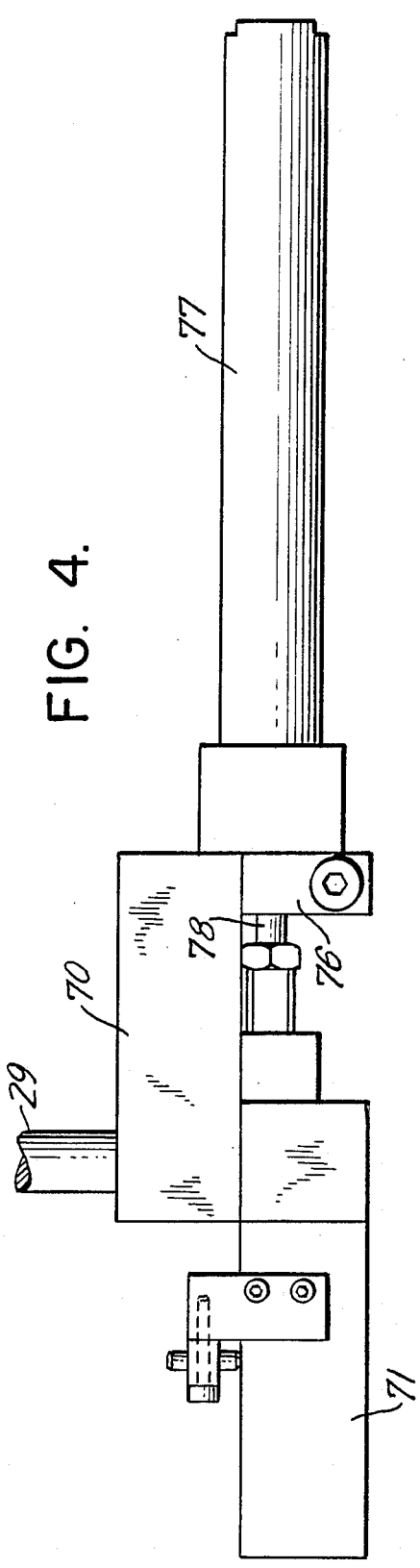

FIGS. 3 and 4 of the drawing illustrate a modified form of cradle and injector device useful for the handling of workpieces of medium length. A mounting block 70 is rigidly attached to the lower ends of the guide rods 29 of the vertical positioning mechanism. The block 70 mounts at its inner end a somewhat elongated cradle block 71, having a V-shaped trough or cradle 72 for the reception and locating of a workpiece 73 to be machined. The workpiece may be fed to the cradle, when the positioning mechanism is in its upper or retracted position, by means of an inclined chute or the like, such as indicated in FIG. 1B. As in the case of the embodiment of FIG. 1, the cradle block 71 is provided with a retaining lever 74 pivotally mounted on a support 75 and yieldably urged to press upon a workpiece received in the cradle, to prevent its movement during high speed transfer motion.

In the embodiment of FIGS. 3 and 4, the outer portion of the mounting block 70 carries a bracket 76 mounting an injector fluid cylinder 77. The operating rod 78 of the fluid cylinder carries a cup 78 at its forward end, which is arranged to engage the outer end of the workpiece.

In the operation of the apparatus of FIGS. 3 and 4, the workpiece is loaded into the cradle in the usual way, when the vertical positioning mechanism is in its upper position. The positioning mechanism is then actuated downwardly by the cylinder 51 (FIG. 1), to an adjusted lower limit position in which the workpiece is precisely aligned with the axis at the gripping chuck 12. The fluid cylinder 77 is then actuated to drive the workpiece 73 into the open chuck, which then grips it for the necessary machining operation or operations. The cylinder rod 78 is then immediately retracted and the vertical positioning mechanism is lifted to its reload position.

The modification of FIGS. 3 and 4 is useful to advantage for the loading of workpieces of somewhat greater axial length than handled by the embodiment of FIG. 1. There is a practical limit, however, to the length of workpiece which may be handled by the embodiment of FIGS. 3 and 4, in that the coaxially aligned fluid cylinder 77 typically has to be about as long as the part, at least as long as the amount of displacement required to load the part. At some practical limit, the combined weight of the cradle block 71 and actuating cylinder 77 may become unwieldy for workpieces of increasingly great length.

It will be readily appreciated, however, that the injector mechanism of FIGS. 3 and 4 may be utilized with a basically "standard" vertical positioning mechanism of the type shown in FIGS. 1 and 2. Although the workpiece holding cradle block 71 is of greater length than the injector mechanism of FIGS. 3 and 4, this can be accommodated by adjustment of the L-shaped bracket 14 longitudinally along its mounting plate 13. In a case where the adjustable limits of the L-shaped bracket are exceeded, new mounting plate 13 may be substituted, to provide for greater overhang of the bracket. In all other respects, the vertical positioning mechanism may be of standardized construction.

For the handling of especially long workpieces, the several mechanisms of FIGS. 5-10 may be employed in conjunction with the basic vertical positioning mechanism illustrated in FIGS. 1 and 2. As shown in FIGS. 5 and 6, the standardized vertical positioning mechanism, shown only in part in FIGS. 5 and 6, but fundamentally similar to that shown in FIGS. 1 and 2, mounts an elongated cradle block 90 having a V-shaped part-receiving cradle 91. To advantage, because of the length of the cradle block 90, only the cradle block itself and no other apparatus is carried by the mounting block 92 attached to the vertical guide rods 29. Even for parts of quite substantial length, e.g., up to about 15 or 16 inches, it is feasible to provide for cantilever mounting of the cradle block 90 by means of the standard vertical positioning mechanism. Because of the substantial length of the workpieces, special means (shown in FIGS. 7-10 and to be described hereinafter) are provided for feeding of the workpieces one-at-a-time into the cradle block 90 and for effecting controlled removal of the workpiece from the chuck and spindle after completion of the machining operations.

To accommodate the great length of the workpiece, an elongated actuating cylinder 93 is mounted by the horizontal plate 15 of the L-shaped mounting bracket 14 of the standard vertical positioning mechanism. The cylinder 93 has a working stroke at least as long as the maximum part length and incorporates precision adjustment means for establishing the limits of retracting and extending movements of the piston rod 94.

In the illustrated arrangement, the actuator rod 94 is connected to a mounting bracket 95 which is rigidly secured to spaced horizontally movable guide rods 96, 97. These rods are guided in bearing blocks 98, 99 carried by the L-shaped bracket 14, to provide adequate guidance and support for the mounting block 95 and the mechanism supported thereon. The guide rods 96 are joined at their rearward ends by a connecting plate 100.

Both the mounting bracket 95 and the connecting plate 100 carry threaded adjusting rods 101, 102, on which are carried threadedly adjustable, calibrated stop collars 103, 104. These cooperate with respective hydraulically damped abutment stops 105, 106, which may be similar to the hydraulically damped abutment stop 59 of the vertical positioning apparatus. FIGS. 5 and 6 show the horizontal injector mechanism in a fully retracted position, in which the cylinder 93 is in its fully retracted condition, with the stop collar 103 against the abutment 105.

Secured to the mounting bracket 95 is a fluid cylinder 107 which is oriented in a partly vertical manner, angled slightly inward toward the spindle 11. As shown particularly in FIG. 6, the cylinder 107, which supports a pusher lug 108 at the end of its operating rod 109, lies above the cradle block 90, even in the retracted position of the injector cylinder 93. However, when the rod 109 is retracted upwardly by the cylinder 107, room is provided for the cradle block 90 to be retracted upwardly by the vertical positioning mechanism as necessary to allow machining operations to proceed.

In a typical cycle of operation with the apparatus of FIGS. 5 and 6, the cylinders 93 and 107 are initially retracted, and the cradle block 90 is lifted to its reload position by the vertical positioning mechanism, the latter being essentially the standard mechanism shown in FIGS. 1 and 2. An elongated workpiece, such as a rod 110 is loaded into the cradle block 90, being supported therein in relatively precise coaxial alignment with the collet chuck 12 carried by the spindle 11. In advance of the workpiece 110 being loaded into the cradle block, the injector cylinder 93 is extended to a predetermined limit position, determined by the adjustment of the stop collar 104 and hydraulically cushioned abutment stop 106. When the injector cylinder has been fully extended, the cylinder 107, which may be referred to for convenience as the pusher cylinder, is extended, bringing the pusher lug 108 into position for proper alignment with the end of the workpiece 110 (see dotted line illustration in FIG. 6). After deposit of a workpiece 110 into the cradle, the injector cylinder 93 is then retracted, causing the workpiece 110 to be pushed into the open collet chuck 12, until the cylinder 93 reaches its retracted limit position, established by the stop collar 103 and cushioned abutment 105.

As soon as the workpiece 110 is fully seated in the collet, it is gripped by the collet. The pusher cylinder 107 may then be retracted and the cradle block 90 lifted by the vertical positioning mechanism to commence a reload cycle, while the necessary machining operations are carried out on the workpiece 110.

Figure 7:
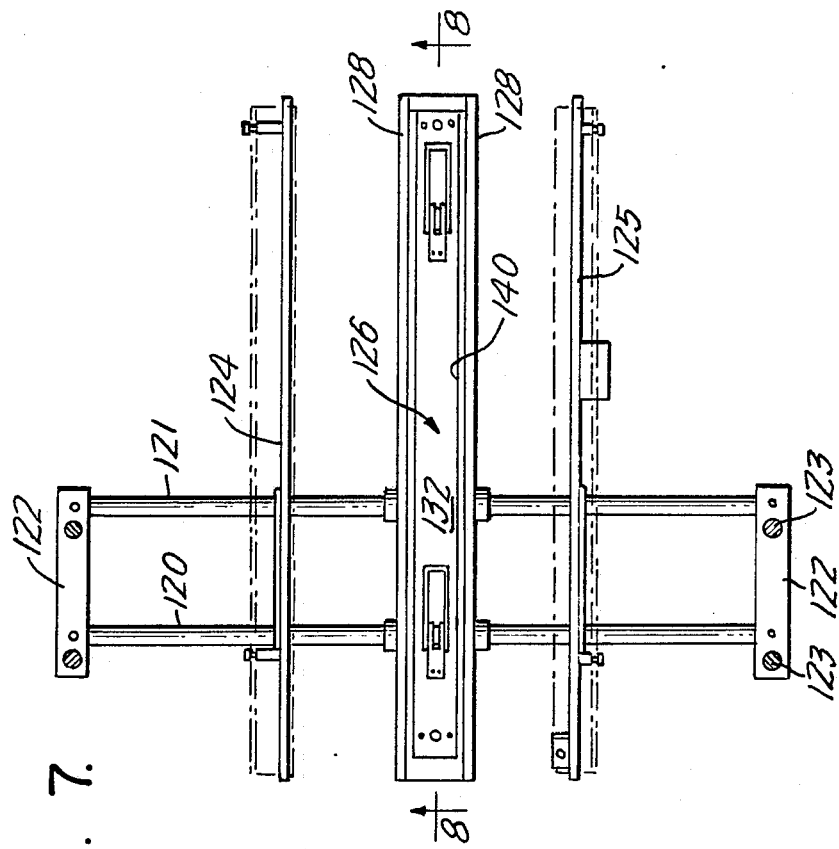
FIG. 7 is a top plan view illustrating an advantageous form of workpiece supply mechanism, useful with the apparatus of the invention for supplying elongated workpieces, one at a time, to a delivery cradle.
Figure 8:
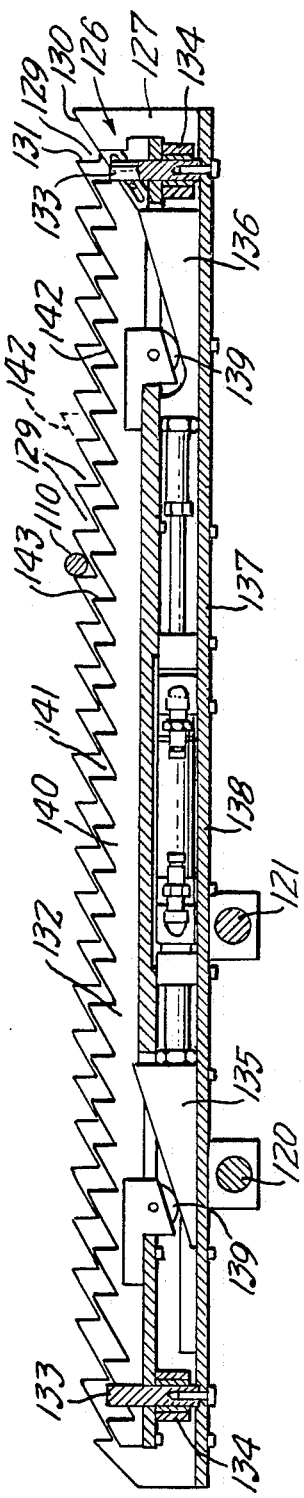
FIG. 8 is an enlarged, fragmentary cross-sectional view, as taken generally on Line 8—8 of FIG. 7.

In the arrangements of FIGS. 5 and 6, although the workpiece is of very substantial length, the necessary high speed, automatic loading operations can be carried out using a basically standardized vertical positioning mechanism, in conjunction with a specially adapted injector mechanism modified to the particular configuration of the workpiece. Thus, even with a somewhat extreme workpiece example reflected in FIGS. 5 and 6, a highly standardized vertical positioning mechanism may be employed, with appropriate accommodations For the handling of workpieces of great length, such as those contemplated by the equipment of FIGS. 5 and 6, it is often inadequate to rely upon simple inclined gravity feeders, which are entirely adequate for shorter workpieces. To handle the longer workpieces, the apparatus of the invention advantageously may incorporate a step feeder mechanism as shown in FIGS. 7 and 8. The feeder of FIGS. 7 and 8 utilizes the principal of the saw tooth feeder, in itself well-known, but incorporates a number of novel and advantageous mechanical adaptations to the generally known principles, optimizing the feeder for the particular purposes intended. The apparatus includes a normally fixed frame structure, including a pair of spaced guide rails 120, 121 connected at their ends by spacer plates 122, which are in turn fixedly supported by posts 123. Adjustably mounted on the guide rods 120, 121 are spaced lateral supports 124, 125 and a central step feed mechanism, generally designated by the reference numeral 126.

The step feed mechanism, shown in more detail in FIG. 8, includes a channel member 127 slideably mounted on the guide rods 120, 121. The vertical sidewalls 128 of the channel are provided with a saw tooth configuration, comprised of a series of triangular recesses 129 defined by a gently inclined surfaces 130 and sharply inclined, almost vertical, surfaces 131.

Housed within the channel 127 is a second and narrower channel 132, which is guided for limited vertical reciprocating motion by means of guide pins 133, rigidly supported in the bottom of the outer channel 127, and guide bushings 134 carried by the inner channel 132. Spaced lift cams 135, 136 are supported by the bottom wall 137 of the outer channel, arranged for simultaneous longitudinal movement in the channel by means of a fluid actuator 138 fixed to the outer channel and connected at each end to the respective lift cams. Cooperating cam rollers 139 are mounted on the inner channel member 132. The arrangement is such that, upon a reciprocating stroke of the actuator 138, the lift cams are driven forward (to the left in FIG. 8) and then back to effect controlled lifting and lowering of the inner channel member 132.

As indicated in FIG. 8, the sidewalls 140 of the inner channel 132 are provided with a saw tooth configuration, generally similar to that of the outer channel 127, but with the respective recesses 141 thereof being offset part way between the corresponding recesses 129 of the outer channel.

The outboard supports 124, 125 are advantageously provided with saw tooth upper edge configurations corresponding substantially with and aligned with the recesses 129 of the outer channel 127.

As shown in FIG. 8, an elongated workpiece 110, such as a long bar section, can rest in one of the recesses 129 of the channel member 127. Outer end portions of the workpiece are supported in recesses of the outer supports 124, 125. It will be understood, in this respect, that in a production operation, each of the saw tooth recesses 129 normally will contain a workpiece.

A feeding operation with the feeder device of FIGS. 7 and 8 is executed by a single reciprocation of the actuator 138, to cause the inner channel member 132 to lift and then to lower back down to the position shown in FIG. 8. The amplitude of the lift is such that the upper, gently inclined surfaces 142 of the inner channel recesses are approximately aligned with the gently inclined surfaces 130 of the outer channel recesses 129. In this lifting process, all of the workpieces 110 are lifted upward until they reach a level where they roll downward to engage the downwardly vertical recess surfaces 143 of the lifted inner channel member 132. When the inner channel is then retracted, by reverse actuation of the cylinder 138, the workpieces 110 are further released and rolled downward into their at-rest position in the next advanced recess in the saw tooth surface. Thus, with each reciprocation of the actuator 138, all of the workpieces are advanced to the left and one of them is delivered into a cradle block 90, such as in FIGS. 5 and 6. The mechanism of FIGS. 7 and 8 is particularly simple, reliable and compact, and is ideally suited for the feeding of elongated workpieces into the loading mechanism of the invention, for high production, automatic handling of parts during machining operations.

For the handling of elongated workpieces, such as the elongated bar 110 heretofore described, ejection of the workpiece from the gripping collet 12, after completion of the machining operation, may require special handing procedures, because of the desire to eject the workpiece in the shortest practicable time, resulting in the workpiece achieving rather substantial exit velocity from the spindle and collet. In order to maintain such workpieces under full control, yet at the same time accommodate relatively high ejection velocities, an apparatus according to FIGS. 9 and 10 may be employed to advantage. The mechanism includes a retractable receiving tube, generally designated by the reference numeral 150, and it is retractably mounted by means of a pair of rotatable arms 151, 152 carried by rotary actuators 153, 154. As shown in the side elevational view of FIG. 10, the actuators move from a vertically upright position, in which the receiving tube 150 is aligned with the spindle axis, to a retracted position, swung downward to the right, in which the receiving is located well below the axis of the spindle, sufficient at least to allow the loading mechanism to move into alignment with the spindle axis for a workpiece loading operation.

In the illustrated arrangement, the receiving tube 15 may be of hollow, generally rectangular configuration and is provided with a swingable bottom wall 155 supported by a longitudinally extending hinge 156 and having a projecting arm portion 157 engageable by an external lug 158 (FIG. 10A) for opening of the bottom wall.

At the remote end of the receiving tube 150, there is provided an hydraulic abutment device 159, including a movable abutment wall 160. When a workpiece is ejected from the spindle 11, it is positively confined within the four walls of receiving tube 150. When the outer end of the workpiece, traveling at relatively high ejection velocity, hits the abutment wall 160, the energy is hydraulically absorbed, and the part drops to the bottom wall of the receiving tube.

To advantage, entry of the ejected workpiece is sensed by a proximity sensor 161, which immediately causes pivotal retraction of the support arms 151, 152. In accordance with one aspect of the invention, as the receiving tube 50 moves downward in its retracting motion, the extending arm 157 of the bottom wall 155 engages the actuating pin 158 (FIG. 10A) tripping the bottom wall to its open position and causing the machined workpiece to be discharged from the bottom of the receiving tube. To particular advantage, the tripping pin 158 may be carried on one of the rotatable support arms 152, but the pin may also be located at any appropriate position to effect the tripping motion as the receiving tube goes through its retracting movements.

With reference now to FIGS. 11 and 12, there are shown uniquely novel and advantageous arrangements for ejection of workpieces from a collet chuck gripper, after completion of machining operations. The embodiment of FIG. 11 is useful particularly for workpieces up to medium length, while the embodiment of FIG. 12 is especially suitable for ejection of elongated workpieces, while at the same time being advantageously useful for workpieces of any length.

In the structure of FIG. 11, the spindle housing is indicated by the reference numeral 10, and the spindle itself by the reference numeral 11. In accordance with known practice, the spindle is mounted in suitable bearings in the housing and is driven by suitable means. A collet chuck 12 is received in the outer end of the spindle and has a tubular extension 200, threaded at its extremity, for engagement with the threaded forward end 201 of elongated, hollow draw tube 202. The draw tube, itself a conventional element, extends entirely through the spindle 11 and into a rotary actuator device, generally indicated by the numeral 203. The draw tube actuator may be fluid or electrically activated and is fixedly mounted at 204 to the back of the spindle housing 10. The draw tube actuator (a conventional device) is arranged (by means not shown) to engage the draw tube for controllable push-pull actuation of the draw tube, while accommodating high speed rotation of the draw tube with the spindle and collet chuck.

For normal operations, a workpiece 205 is loaded into the open end of the collet chuck 12 and seated against an internal stop 206 located in a fixed position. The draw tube actuator 203 is then energized to draw the tube 202 rearwardly, pulling the collet chuck 12 into the spindle nose. Because of complementary tapered surfaces on the collet chuck and spindle nose, the collet chuck is caused to squeeze and tightly grip the workpiece 202, all in a well-known manner.

In accordance with the invention, novel ejector mechanism for the apparatus in FIG. 11 includes a fluid cylinder 207, housed within the draw tube 202 and supported concentrically therein at its forward end by means of a friction collar 208, which is tightly received over the neck portion 209 of the fluid cylinder. The operating rod 210 of the fluid cylinder mounts the workpiece stop 206 and, pursuant to the invention, serves when the fluid cylinder 207 is in a fully retracted condition, to precisely position the stop 206 in its desired position.

As shown in FIG. 11, a hollow spacer tube 211 is threadedly coupled at its forward end to the fluid cylinder 207 and extends rearwardly beyond the end of a fixed support bracket 212 carried by the housing of the draw tube actuator 203. The spacer tube 211 has an elongated threaded section 213, which extends through an anti-friction bearing 214. A pair of adjusting nuts 215 engages the threaded portion 213 on opposite sides of the anti-friction bearing spacer 211 axially with respect to the anti-friction bearing, while accommodating axial adjustment of the spacer tube for precision positioning of the stop member 206.

In normal operation of the apparatus of FIG. 11, the spindle 11, collet 12 and draw tube 202 will be in high speed rotation, as will the cylinder 207 and spacer tube 211. The anti-friction bearing 14 accommodates such high speed rotation of the spacer tube relative to the fixed bracket 212, while supporting the rearward end of the tube. The rearward extremity 216 of the tube is connected through a coupling member 217 to a conventional high speed rotary coupling 218, which is connected to a source of actuating fluid. In this respect, the actuating fluid preferably used for any of the fluid actuators described herein is compressed air, as such is readily available in the factory and provides for a very high speed operation of the actuators.

When machining of the workpiece 205 has been completed, compressed air is injected into the cylinder 207, through the spacer tube 211, causing a sharp forward stroke of the operating rod 110, thus, rapidly and forcibly ejecting the machined workpiece 205 from the front of the collet 12. The operating rod 210 is then immediately withdrawn to its retracted position, in which it serves as a precision fixed stop for the proper loading of a new workpiece into the collet chuck 12.

The ejector arrangement of FIG. 11 is simplified and compact, and enables the fluid actuator to be located within the rotating draw tube 202. For minor variations in workpiece length, adjustment may be accommodated by means of the stop nuts 215. For more substantial variations in workpiece length, exceeding the limits of the threaded portion 213 of the spacer tube, a different length of tube may be substituted.

In the embodiment of FIG. 12, instead of mounting an actuating cylinder within the draw tube, the draw tube itself forms the actuating cylinder. Thus, in the FIG. 12 embodiment the draw tube 302 is sealed at its rearward end by a stop plunger element 303 that is positioned adjacent the open end of the draw tube, but within the tube, and is in fluid sealed relation therewith by means of an O-ring or similar packing 304. The stop plunger 303 communicates with a threaded hollow tube 305, which is normally fixed in, but is longitudinally adjustable with respect to, an anti-friction bearing 306. Adjustable nuts 307 on each side of the bearing enable the longitudinal position of the threaded tube 305 to be accurately adjusted and fixed. The stop plunger 303 has a through passage communicating with the threaded tube 305, for the admission of compressed air into the interior of the draw tube. At its rearward end, the threaded tube 305 is connected to a conventional rotary coupling unit 308 connected by a supply line 309 to the source of compressed air.

In accordance with the invention, a slidable piston 310 is received internally of the draw tube 302 and is provided with appropriate fluid seals, such as O-rings 311 at each end, to provide for fluid-tight sealing with the internal walls of the draw tube. Projecting from the front end of the piston 310 is a spacer bar 312, which is of predetermined length to serve as an abutment stop for an elongated workpiece 110. Desirably, the piston 310 has sufficient axially length to provide adequate support for the spacer bar 312, to maintain its concentricity within the interior of the draw tube 302. In the operation of the apparatus in FIG. 12, a workpiece 110 is injected into the spindle 11 and collet chuck 12 by loader means such as, for example, that shown in FIGS. 5 and 6. The workpiece 110 when pushed into the spindle and collet, seats against the front end of the spacer bar 312 and drives the spacer bar and piston 310 rearwardly until the piston is stopped by contact with the stop plunger 303. By preadjustment of the parts, this establishes a precision positioning of the workpiece 110. The draw tube 302 is then drawn rearwardly by the draw tube actuator 203, causing the workpiece 110 to be gripped by the collet 12.

In both the arrangements of FIGS. 11 and 12, the workpiece positioning abutment means are mounted in the fixed brackets 212 (FIG. 11) and 314 (FIG. 12) such that the workpiece position is maintained even though the draw tube and collet move rearwardly a short distance during the gripping of the workpiece.

In order to eject the workpiece 110 from its gripped position, as shown in FIG. 12, compressed air is admitted to the rear end of the draw tube, through the hollow threaded tube 305. The piston 310 is rapidly driven forward, ejecting the part 110 out of the front of the collet 12. When the piston 310 reaches the front of the draw tube, it is stopped against an adjustably positioned collar 315, threadedly received within the draw tube 302 behind the collet 12. against an adjustably positioned collar 315, threadedly received within the draw tube 302 behind the collet 12.

The ejector mechanism of FIG. 12 is uniquely advantageous in that it utilizes the draw tube 302, necessarily employed in the actuation of the collet chuck 12, as the cylinder element of a fluid actuator. Virtually unlimited adjustability of the ejector mechanism is enabled, within the limits of the full length of the draw tube, by simply exchanging one threaded air supply tube 305 for another, once the range of adjustability by (means of the nuts 307) of a given tubular element has been exceeded.

The various mechanisms described herein provide for a low cost, highly versatile, highly effective facility for the loading and discharge of workpieces from a small high speed lathe. In particular, the overhead loader means, utilizing a relatively universal, standardized vertical positioning mechanism for handling of parts of a wide variety of sizes and shapes with minimum customization requirements enables an automatic loading facility to be practically applied to a small machining unit. The ability to use a universal positioning mechanism in a wide variety of circumstances, makes for a high degree of cost effectiveness, which is of It should be understood, of course, that the specific forms of the invention herein illustrated and described are intended to be representative only, as certain changes may be made therein without departing from the clear teachings of the disclosure. Accordingly, reference should be made to the following appendent claims in determining the full scope of the invention.

We claim:

1. An overhead loader for a high speed automatic lathe or the like having a spindle housing, a work-holding spindle rotatably mounted in said housing, and a gripping chuck carried by said spindle, said loader comprising
   (a) a mounting bracket member mounted on said spindle housing and having a portion extending above said spindle,
   (b) means providing for adjustable positioning of said mounting bracket member in the direction of the spindle axis,
   (c) a workpiece positioning mechanism mounted on said mounting bracket member,
   (d) means providing for adjustable locating of said positioning mechanism on said mounting bracket member for movement toward and away from said spindle axis,
   (e) said workpiece positioning mechanism including a workpiece receiving cradle and vertically reciprocal guide means for moving said cradle from an elevated position, for receiving a workpiece from a workpiece supply during machining operations of said lathe or the like, to an extended position, in which said workpiece is aligned with said spindle axis,
   (f) first actuator means connected to said guide means for controllably raising and lowering said guide means and said cradle,
   (g) stop means cooperating with said guide means for establishing the upper and lower limit positions of said cradle,
   (h) at least one of said stop means being adjustable to provide for adjustment of the stroke of said first actuator means,
   (i) injector actuator means operative when said cradle is in its lower limit position to inject a workpiece from said cradle and into said gripping chuck.

2. An overhead loader according to claim 1, further characterized by
   (a) said mounting bracket member comprising a generally L-shaped bracket comprising horizontal and vertical bracket plates,
   (b) a mounting plate secured to said lathe and supporting said horizontal bracket plate for adjustable movement in a direction parallel to the spindle axis,
   (c) a positioning plate adjustably mounted on said vertical bracket plate for adjustable movement toward and away from the spindle axis, and
   (d) said position plate mounting said workpiece positioning mechanism.

3. An overhead loader according to claim 2, further characterized by
   (a) said injector actuator means comprising an injector fluid cylinder mounted on said horizontal bracket plate and cooperating with said workpiece receiving cradle when said cradle is in its lower limit position.

4. An overhead loader according to claim 3, further characterized by
   (a) an injector pin carried adjacent said cradle and operative, when actuated, to displace a workpiece from said cradle into said chuck,
   (b) a pin actuating lever carried by said positioning mechanism for movement with said cradle, and
   (c) said lever having a portion operatively positioned relative to said injector fluid cylinder when said cradle is in said lower limit position, whereby said lever and said injector pin may be actuated by said injector fluid cylinder.

5. An overhead loader according to claim 3, further characterized by
   (a) said injector cylinder having an operating rod of sufficient length to extend from a retracted position generally directly above said gripping chuck to an extended portion generally directly above the outer end of an elongated workpiece supported by said cradle,
   (b) a workpiece pusher element mounted by said operating rod, and (c) said pusher element being engageable with the outer end of said workpiece and operative to push said workpiece into said chuck upon retracting movement of said operating rod.

6. An overhead loader according to claim 5, further characterized by
   (a) means mounting said pusher element for vertically retractable movement on said operating rod.

7. An overhead loader according to claim 6, further characterized by
   (a) said mounting means comprising a fluid cylinder carried by the operating rod of said injector cylinder and mounting said pusher elements for vertical movement between operative and retracted positions.

8. An overhead loader according to claim 1, further characterized by
   (a) said vertically reciprocal guide means comprising a pair of vertically oriented guide rods arranged in straddling relation to the axis of said spindle,
   (b) said guide rods being rigidly connected at their upper and lower ends, and
   (c) said actuator means comprising a fluid cylinder vertically aligned and positioned between said guide rods.

9. An overhead loader according to claim 8, further characterized by
   (a) said means providing for adjustable locating of said positioning mechanism comprising means for vertically adjustably positioning said fluid cylinder on said mounting bracket,
   (b) one limit position of said workpiece receiving cradle being determined by said last mentioned means for vertically adjustably positioning said fluid cylinder, in conjunction with one limit position of actuator movement, and
   (c) the other limit position of said cradle being determined by said adjustable stop means.

10. An overhead loader for an automatic lathe or the like having a spindle housing, a work-holding spindle rotatably mounted in said housing, and a gripping chuck carried by said spindle, said loader comprising
    (a) an L-shaped mounting bracket including horizontal and vertical bracket plates,
    (b) a horizontal mounting plate secured to said spindle housing,
    (c) means for adjustably securing said horizontal bracket plate to said horizontal mounting plate for horizontal adjustment in a direction parallel to the axis of said spindle,
    (d) a positioning plate mounted on said vertical bracket plate for vertical adjustment thereon in a direction toward and away from said spindle axis,
    (e) a pair of spaced apart vertically moveable guide rods,
    (f) linear bearing means mounted on said positioning plate for guiding said rods in vertical movement,
    (g) upper and lower connecting members rigidly connecting said guide rods above and below said bearing means,
    (h) workpiece holding cradle means carried by said guide rods adjacent their lower ends, and
    (i) fluid actuator means mounted on said positioning plate and connected to said guide rods for controllably raising and lowering said guide rods.

11. An overhead loader according to claim 10, further characterized by
    (a) first precision adjustment screw means connecting said positioning plate and said mounting bracket, for effecting precise vertical adjustment of said positioning plate, and
    (b) second precision adjustment carried in part by said guide rods and in part by said mounting bracket and operative to controllably predetermine the limit of movement of said guide rods and cradle toward said spindle axis.

12. An overhead loader according to claim 10, further characterized by
    (a) workpiece injector means associated with said loader, and
    (b) said injector means including an injector fluid cylinder fixedly mounted by said mounting bracket and cooperatively associated with said cradle when said cradle in a lower limit position supporting a workpiece in aligned relation with said gripping chuck.

* * * * *